(12) United States Patent
Hossan (10) Patent No.: US 8,722,839 B2
(45) Date of Patent: May 13, 2014

(54) POLY(PHENYLENE ETHER) FIBER AND METHOD OF MAKING

(75) Inventor: Robert John Hossan, Delmar, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/487,367

(22) Filed: Jun. 4, 2012

(65) Prior Publication Data

US 2013/0324628 A1   Dec. 5, 2013

(51) Int. Cl.
*C08G 61/02*   (2006.01)

(52) U.S. Cl.
USPC .......... 528/86; 528/480; 264/140; 264/176.1; 264/219; 428/402

(58) Field of Classification Search
USPC ............... 528/86, 480; 264/140, 176.1, 219; 428/402
See application file for complete search history.

(56) References Cited

U.S. PATENT DOCUMENTS

| | | | |
|---|---|---|---|
| 3,063,782 A | 11/1962 | Thomas | |
| 3,306,874 A | 2/1967 | Hay | |
| 3,457,343 A | 7/1969 | van Lohuizen et al. | |
| 3,476,849 A | 11/1969 | Duiser et al. | |
| 3,496,236 A * | 2/1970 | Cooper et al. | 568/638 |
| 3,621,091 A | 11/1971 | Hertz et al. | |
| 4,955,993 A | 9/1990 | Sanders, Jr. et al. | |
| 4,970,272 A | 11/1990 | Gallucci | |
| 5,189,099 A | 2/1993 | Arnold-Mauer et al. | |
| 5,202,023 A | 4/1993 | Trimmer et al. | |
| 5,225,270 A | 7/1993 | Bhoori et al. | |
| 5,334,444 A | 8/1994 | Bhoori et al. | |
| 5,559,149 A | 9/1996 | Clum et al. | |
| 5,612,112 A | 3/1997 | Kotek et al. | |
| 5,618,885 A | 4/1997 | Kotek et al. | |
| 5,623,024 A | 4/1997 | Kotek et al. | |
| 5,698,101 A | 12/1997 | Kopp et al. | |
| 6,028,130 A | 2/2000 | Weber | |
| 6,140,409 A | 10/2000 | Weber et al. | |
| 6,172,148 B1 | 1/2001 | Weber et al. | |
| 6,194,496 B1 | 2/2001 | Weber et al. | |
| 6,197,869 B1 | 3/2001 | Weber et al. | |
| 6,204,315 B1 | 3/2001 | Weber et al. | |
| 7,022,765 B2 | 4/2006 | Adedeji et al. | |
| 2005/0046070 A1 | 3/2005 | Dong et al. | |
| 2007/0083035 A1 | 4/2007 | Riding et al. | |
| 2009/0211967 A1 | 8/2009 | Delsman et al. | |

FOREIGN PATENT DOCUMENTS

| | | | |
|---|---|---|---|
| BE | 715114 A | 8/1968 | |
| CS | 8709623 | 9/1989 | |
| DE | 1770221 A1 | 3/1972 | |
| DE | 199110423 U1 | 12/1991 | |
| DE | 4105924 A1 | 8/1992 | |
| DE | 4105925 A1 | 8/1992 | |
| DE | 4128350 A1 | 3/1993 | |
| DE | 4139625 A1 | 6/1993 | |
| DE | 4208340 A1 | 9/1993 | |
| DE | 4209029 A1 | 9/1993 | |
| DE | 4209031 A1 | 9/1993 | |
| DE | 4209032 A1 | 9/1993 | |
| DE | 4209033 A1 | 9/1993 | |
| DE | 4216588 A1 | 11/1993 | |
| DE | 4240445 A1 | 6/1994 | |
| DE | 4333020 A1 | 3/1995 | |
| DE | 19650370 A1 | 6/1998 | |
| DE | 19805586 A1 | 8/1999 | |
| EP | 0480677 A2 | 4/1992 | |
| EP | 0530558 A2 | 3/1993 | |
| EP | 0530695 A2 | 3/1993 | |
| EP | 0535486 A1 | 4/1993 | |
| EP | 0903376 A2 | 3/1999 | |
| EP | 0962496 A1 | 12/1999 | |
| GB | 930993 | 7/1963 | |
| GB | 1148142 | 4/1969 | |
| JP | 53065413 A | 6/1978 | |
| JP | 53065414 A | 6/1978 | |
| JP | 10219519 A | 8/1998 | |
| JP | 2008069478 * | 3/2008 | ............... D01F 6/66 |
| JP | 2008069478 A | 3/2008 | |
| WO | 2009104107 A1 | 8/2009 | |

OTHER PUBLICATIONS

International Search Report and Written Opinion; International Filing Date Dec. 13, 2012; Date of Mailing Apr. 8, 2013, P020427PCT; 9 pages.
Innovation Seminar; Microsoft PowerPoint Presentation; "Technical Textiles—High Performance Fibers"; Greensboro, NC; Oct. 13, 2005; 62 pages.
Liang, et al.; Elongation Properties of Polyethylene Melts; Polymer Engineering and Science; pp. 2490-2494; (2011).
U.S. Appl. No. 13/229,066, filed Sep. 9, 2011, "Poly(arylene ether) Composition, Method, and Article".
U.S. Appl. No. 14/132,672, filed with the USPTO on Dec. 18, 2013.

\* cited by examiner

*Primary Examiner* — Shane Fang
(74) *Attorney, Agent, or Firm* — Cantor Colburn LLP (57) ABSTRACT

A fiber comprises a composition including a poly(phenylene ether) having less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether). Fiber of low denier can be formed from this composition. The fiber can be formed by melt spinning.

24 Claims, 2 Drawing Sheets

POLY(PHENYLENE ETHER) FIBER AND METHOD OF MAKING

BACKGROUND OF THE INVENTION

Prior studies on preparing melt spun fibers containing poly(phenylene ether) have focused on blends of amorphous poly(phenylene ether) and crystalline resins such as polyamide. Poly(phenylene ether) and polyamide are immiscible. Therefore blends thereof typically form two phases in which the polyamide is the continuous phase and the poly(phenylene ether) is the disperse phase. The properties of the blend are similar to the properties of the crystalline polyamide continuous phase, not the amorphous poly(phenylene ether) phase. Thus, the ease of spinning fibers from poly(phenylene ether)/polyamide blends is determined by the crystalline polyamide. Poly(phenylene ether) and polystyrene, on the other hand, are miscible, forming a single amorphous phase. Therefore the properties of the poly(phenylene ether) affect the ease of spinning fibers from poly(phenylene ether)/polystyrene blends. Previous studies on melt spinning fibers from poly(phenylene ether)/polystyrene blends have given inconsistent results. Some lots of poly(phenylene ether) provide poly(phenylene ether)/polystyrene blends that can easily be drawn down into small denier fibers of less than 10 denier while other lots of poly(phenylene ether) having the identical nominal composition cannot.

It is desirable to be able to manufacture poly(phenylene ether) and poly(phenylene ether)/polystyrene blends that can consistently and reliably be converted into small diameter fibers of less than 10 denier through melt spinning. In order to achieve this end, it is also desirable to find properties of the poly(phenylene ether) that correlate with the ease of spinning fibers from poly(phenylene ether) and poly(phenylene ether)/polystyrene blends.

BRIEF SUMMARY OF EMBODIMENTS OF THE INVENTION

The above-described goals are achieved by a fiber comprising a composition comprising a poly(phenylene ether), wherein the fiber comprises less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether).

Another embodiment is a fiber comprising a composition comprising about 70 to 100 weight percent of poly(2,6-dimethyl-1,4-phenylene ether); and 0 to about 30 weight percent atactic homopolystyrene; wherein all weight percents are based on the total weight of the poly(2,6-dimethyl-1,4-phenylene ether) and the atactic homopolystyrene, and wherein the poly(2,6-dimethylphenyl-1,4-phenylene ether) comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

Another embodiment is a method of forming a composition comprising mixing about 50 to about 99 weight percent of a poly(phenylene ether), and about 1 to about 50 weight percent of a poly(alkenyl aromatic); wherein all weight percents are based on the total weight of the poly(phenylene ether) and the poly(alkenyl aromatic); and wherein the composition comprises less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether).

Another embodiment is a method of forming a fiber, comprising spinning a composition comprising a poly(phenylene ether), wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(phenylene ether).

Another embodiment is a method of forming a fiber, comprising melt spinning a composition comprising about 70 to 100 weight percent of poly(2,6-dimethyl-1,4-phenylene ether); and 0 to 30 weight percent atactic homopolystyrene; wherein all weight percents are based on the total weight of the poly(2,6-dimethyl-1,4-phenylene ether) and the atactic homopolystyrene; and wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

These and other embodiments are described in detail below.

BRIEF DESCRIPTION OF THE DRAWINGS

FIG. 2a depicts a full screw configuration which has a high intensity mixing element in the downstream portion of the configuration. FIG. 2b depicts a full screw configuration which has a low intensity mixing element in the downstream portion of the configuration.

DETAILED DESCRIPTION OF THE INVENTION

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Since poly(phenylene ether) and polystyrene are miscible, forming a single amorphous phase, the properties of the poly(phenylene ether) affect the ease of spinning fibers from poly(phenylene ether)/polystyrene blends as well as from poly(phenylene ether) itself. This is in contrast to poly(phenylene ether)/polyamide blends, in which the properties of the polyamide continuous phase and the compatibility of the poly (phenylene ether) and polyamide phases, not the properties of the poly(phenylene ether) disperse phase, affect the ease of spinning of fibers.

The present inventors have determined that poly(phenylene ether) and poly(phenylene ether)/polystyrene blends which contain low concentrations of ethylene bridge groups and rearranged backbone groups in the poly(phenylene ether), as measured by nuclear magnetic resonance spectroscopy, can be melt spun into smaller diameter fiber than blends containing high concentrations of these groups. The present inventors have also determined that concentrations of ethylene bridge groups and rearranged backbone groups in poly (phenylene ether) and poly(phenylene ether)/polystyrene blends can be controlled by adjusting the conditions under which the blends are mixed. It is now possible to both predict which lots of poly(phenylene ether) are suitable for melt spinning small diameter fibers, and to control the polymer mixing conditions so that poly(phenylene ether) and poly (phenylene ether)/polystyrene fibers of low diameter can be consistently made.

The fiber comprises a composition comprising a poly(phenylene ether). Suitable poly(phenylene ether)s include those comprising repeating structural units having the formula wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a 3,5-dimethyl-1,4-phenyl group with the di-n-butylamine component of an oxidative polymerization catalyst. As another example, $Z^1$ can be a morpholinomethyl group formed by reaction of a 3,5-dimethyl-1,4-phenyl group with the morpholine component of an oxidative polymerization catalyst.

The poly(phenylene ether) can have an intrinsic viscosity of about 0.25 to about 1 deciliter per gram measured at 25° C. in chloroform. Within this range, the poly(phenylene ether) intrinsic viscosity can be about 0.3 to about 0.65 deciliter per gram, more specifically about 0.35 to about 0.5 deciliter per gram, even more specifically about 0.4 to about 0.5 deciliter per gram. The poly(phenylene ether) can have a weight average molecular weight of about 40,000 to about 90,000 atomic mass units, specifically about 50,000 to about 80,000 atomic mass units, more specifically about 50,000 to about 70,000 atomic mass units.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether).

The poly(phenylene ether) can be in the form of a homopolymer, a copolymer, a graft copolymer, an ionomer, or a block copolymer, as well as combinations comprising at least one of the foregoing.

In some embodiments, the poly(phenylene ether) is essentially free of incorporated diphenoquinone residues. In this context, "essentially free" means that less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. For example, when a poly(phenylene ether) is prepared by oxidative polymerization of 2,6-dimethylphenol to yield poly(2,6-dimethyl-1,4-phenylene ether) and 3,3', 5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it can be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

The poly(phenylene ether) used to prepare the fiber can comprise poly(phenylene ether) rearrangement products, such as bridging products and branching products. For example, poly(2,6-dimethyl-1,4-phenylene ether) can comprise the bridging fragment below:

This branching fragment is referred to herein as an "ethylene bridge group". As another example, poly(2,6-dimethyl-1,4-phenylene ether) can comprise the branching fragment below:

This bridging fragment is referred to herein as a "rearranged backbone group". These fragments can be identified and quantified by $^{31}$P nuclear magnetic resonance spectroscopy as described below.

The present inventors have determined that poly(phenylene ether) and poly(phenylene ether)/poly(alkenyl aromatic) blends which contain low concentrations of ethylene bridge groups and rearranged backbone groups in the poly(phenylene ether), as measured by $^{31}$P nuclear magnetic resonance spectroscopy, can be melt spun into smaller diameter fiber than blends containing higher concentrations of these groups. Thus in some embodiments, the fiber comprises a composition comprising less than or equal to 1000 parts per million, specifically less than or equal to 500 parts per million, more specifically less than or equal to 300 parts per million, and yet more specifically less than or equal to 240 parts per million by weight, based on the weight of the poly(phenylene ether), of hydroxyl groups associated with ethylene bridge groups. In some embodiments, the fiber comprises less than or equal to 5,000 parts per million, specifically less than or equal to 2,000 parts per million, more specifically less than or equal to 1,000 parts per million, still more specifically less than or equal to 900 parts per million, and yet more specifically, less than or equal to 800 parts per million by weight, based on the weight of the poly(phenylene ether), of hydroxyl groups associated with rearranged backbone groups.

In some embodiments, the composition comprises a poly(alkenyl aromatic). The alkenyl aromatic monomer used to prepare the poly(alkenyl aromatic) can have the structure wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene.

In some embodiments, the alkenyl aromatic monomer is styrene, and the poly(alkenyl aromatic) is homopolystyrene. As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene consists of atactic homopolystyrene. In some embodiments, the homopolystyrene has a melt volume flow rate of 1.5 to 5 cubic centimeters per 10 minutes, measured at 200° C. and a 5 kilogram load according to ISO 1133. In some embodiments, the poly(phenylene ether) comprises poly(2,6-dimethyl-1,4-phenylene ether) and the poly(alkenyl aromatic) comprises atactic homopolystyrene.

In some embodiments, the composition comprises about 50 to 100 weight percent, specifically about 60 to 100 weight percent, more specifically about 70 to 100 weight per, still more specifically about 80 to 100 weight percent, and even more specifically, about 90 to 100 weight percent of the poly(phenylene ether), and 0 to about 50 weight percent, specifically 0 to about 40 weight percent, more specifically 0 to about 30 weight percent, still more specifically, 0 to about 20 weight percent, and even more specifically, 0 to 10 weight percent of the poly(alkenyl aromatic); wherein all weight percents are based on the total weight of the poly(phenylene ether) and the poly(alkenyl aromatic).

In some embodiments, the composition is homogeneous. A polymer blend can have a single phase or multiple phases. The number of phases depends on the miscibility or solubility of the individual polymers with each other. In a homogenous blend, the polymers are dissolved in each other, resulting in a single, continuous phase, and the blend exhibits a single glass transition temperature. Poly(2,6-dimethyl-1,4-phenylene ether) and polystyrene are miscible in all proportions, and form homogeneous blends which are suitable for fiber spinning.

In some embodiments, the composition further comprises an impact modifier. The impact modifier can comprise a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some embodiments, the rubber-modified polystyrene has an effective gel content of 10 to 35 percent. Suitable rubber-modified polystyrenes are commercially available as, for example, HIPS3190 from SABIC Innovative Plastics.

The impact modifier can comprise a hydrogenated block copolymer of an alkenyl aromatic monomer and a conjugated diene. For brevity, this component is referred to as the "hydrogenated block copolymer". The alkenyl aromatic monomer used to prepare the hydrogenated block copolymer can have the structure wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block and B-A-B block), tetrablock (A-B-A-B block), and pentablock (A-B-A-B-A block and B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof. In some embodiments, the hydrogenated block copolymer comprises a polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. Alternatively, in some embodiments, the hydrogenated block copolymer includes the residue of one or more acid functionalizing agents, such as maleic anhydride.

Methods for preparing hydrogenated block copolymers are known in the art and hydrogenated block copolymers are commercially available. Illustrative commercially available hydrogenated block copolymers comprising about 38 to about 46 weight percent poly(alkenyl aromatic) content include the polystyrene-poly(ethylene-butylene-styrene)-polystyrene (S-EB/S-S) triblock copolymer comprising 40 weight percent polystyrene available from Kraton Polymers as KRATON RP-6936, and the polystyrene-poly(ethylene-butylene)-polystyrene triblock copolymer comprising 42 weight percent polystyrene available from Asahi Kasei Elastomer as TUFTEC H1051. Mixtures of two of more hydrogenated block copolymers can be used.

When the composition comprises an impact modifier, the composition can be heterogeneous. In a heterogeneous blend of poly(phenylene ether) and an impact modifier, the poly (phenylene ether) and the impact modifier are only partially miscible or are immiscible, which results in two phases, a continuous phase and a disperse phase. In some embodiments, the composition comprises a continuous phase comprising the poly(phenylene ether) and a disperse phase comprising the impact modifier. In order to form fibers, it is desirable that the particle size of the disperse phase is small than the diameter of the fibers. In particular, the particle size of the disperse phase should be less than or equal to 5 micrometers, specifically less than or equal to 2 micrometers.

The composition can, optionally, minimize or exclude polyamide. For example, in some embodiments, the composition comprises less than or equal to 20 weight percent polyamide. Within this range, the composition can comprise less than or equal to 10 weight percent, specifically less than or equal to 5 weight percent, more specifically less than or equal to 1 weight percent, of polyamide. In some embodiments, the composition excludes polyamide.

Polyamides, also known as nylons, are characterized by the presence of a plurality of amide (—C(O)NH—) groups and are described in U.S. Pat. No. 4,970,272 to Gallucci. Suitable polyamides include polyamide-6, polyamide-6,6, polyamide-4, polyamide-4,6, polyamide-12, polyamide-6,10, polyamide-6,9, polyamide-6,12, amorphous polyamides, polyamide-6/6T and polyamide-6,6/6T with triamine contents below 0.5 weight percent, polyamide-9T, and combinations thereof. The polyamide can comprise polyamide-6,6, or polyamide-6 and polyamide-6,6. The polyamide or combination of polyamides can have a melting point ($T_m$) greater than or equal to 171° C.

The polyamide can have an intrinsic viscosity of up to 400 milliliters per gram, specifically 90 to 350 milliliters per gram, and more specifically 110 to 240 milliliters per gram, as measured on a 0.5 weight percent solution in 96 weight percent sulfuric acid in according to ISO 307. The polyamide can have a relative viscosity of up to 6 milliliters per gram, specifically 1.89 to 5.43 milliliters per gram, and more specifically 2.16 to 3.93 milliliters per gram, as measured on a 1 weight percent solution in 96 weight percent sulfuric acid according to DIN 53727.

The polyamide can have an intrinsic viscosity of up to 400 milliliters per gram, specifically 90 to 350 milliliters per gram, and more specifically 110 to 240 milliliters per gram, as measured on a 0.5 weight percent solution in 96 weight percent sulfuric acid in according to ISO 307. The polyamide can have a relative viscosity of up to 6 milliliters per gram, specifically 1.89 to 5.43 milliliters per gram, and more specifically 2.16 to 3.93 milliliters per gram, as measured on a 1 weight percent solution in 96 weight percent sulfuric acid according to DIN 53727.

The composition can optionally comprise one or more additives selected from the group consisting of stabilizers, antioxidants, mold release agents, processing aids, flame retardants, drip retardants, nucleating agents, UV blockers, dyes, pigments, anti-static agents, blowing agents, mineral oil, metal deactivators, anti-blocking agents, and conductive agents. When present in the composition, the additives can be present in a combined amount of about 0.1 to about 10 weight percent, specifically about 0.2 to about 5 weight percent, and more specifically about 0.5 to about 2 weight percent, based on the total weight of the composition.

In some embodiments, the fiber comprises a composition consisting of about 50 to about 100 weigh percent of a poly (phenylene ether), 0 to about 50 weight percent of a poly (alkenyl aromatic), and optionally about 0.1 to about 10 weight percent of one or more additives selected from the group consisting of stabilizers, antioxidants, mold release agents, processing aids, flame retardants, drip retardants, nucleating agents, UV blockers, dyes, pigments, anti-static agents, blowing agents, mineral oil, metal deactivators, anti-blocking agents, and conductive agents, wherein all weight percents are based on the total weight of the composition.

In a specific embodiment, the fiber comprises a composition comprising about 70 to 100 weight percent of poly(2,6-dimethyl-1,4-phenylene ether); and 0 to about 30 weight percent atactic homopolystyrene; wherein all weight percents are based on the total weight of the poly(2,6-dimethyl-1,4-phenylene ether) and the atactic homopolystyrene, and wherein the poly(2,6-dimethyl-1,4-phenylene ether) comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

In another specific embodiment, the fiber comprises a composition comprising about 90 to 100 weight percent of poly (2,6-dimethyl-1,4-phenylene ether); and 0 to about 10 weight percent atactic homopolystyrene; wherein all weight percents are based on the total weight of the poly(2,6-dimethyl-1,4-phenylene ether) and the atactic homopolystyrene, and wherein the poly(2,6-dimethyl-1,4-phenylene ether) comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

Standard melt spinning equipment accepts polymer feed in pellet form. Designs which permit the use of a powder are also envisioned. In these designs, poly(phenylene ether) powder, which has not been melt blended with poly(alkenyl aromatic), or other polymers or additives, can be used. Advantageously, the use of poly(phenylene ether) powder provides poly(phenylene ether) that has not been subject to the heat history that melt blended poly(phenylene ether) pellets are subject to. In the absence of a melt blending step, the content of hydroxyl groups associated with ethylene bridge groups and hydroxyl groups associated with rearranged backbone groups is minimized. Thus, in some embodiments, the composition excludes poly(alkenyl aromatic).

Fibers can take many shapes. For example, a fiber can be round, flat (ribbon shaped), tri-lobal, or multi-lobal (for example 4DG fibers). Fibers can be solid or hollow. Hollow fibers are made by a wet spinning process wherein a polymer solution is injected through an annular nozzle into an antisolvent bath. Hollow fibers can have a wall thickness of about 100 micrometers and a diameter of several millimeters. They are used in gas separation applications. In some embodiments, the fiber is a solid fiber.

In some embodiments, the composition of the fiber is formed by mixing about 50 to about 99 weight percent of a poly(phenylene ether), and about 1 to about 50 weight percent of a poly(alkenyl aromatic); wherein all weight percents are based on the total weight of the poly(phenylene ether) and the poly(alkenyl aromatic); and wherein the composition comprises less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether). All of the above-described variations in the composition apply as well to the method of forming the composition. For example, in some embodiments, the poly (phenylene ether) comprises poly(2,6-dimethyl-1,4-phenylene ether) and the poly(alkyl aromatic) comprises atactic homopolystyrene.

In some embodiments, the composition of the fiber is formed by melt blending. The melt blending can be performed using known equipment such as ribbon blenders, Henschel mixers, Banbury mixers, drum tumblers, single-screw extruders, twin-screw extruders, multi-screw extruders, co-kneaders, and the like. For example, the present composition can be prepared by melt blending the components in a twin-screw extruder at a temperature of about 290 to about 370° C., specifically about 320 to about 340° C.

Figure 2:
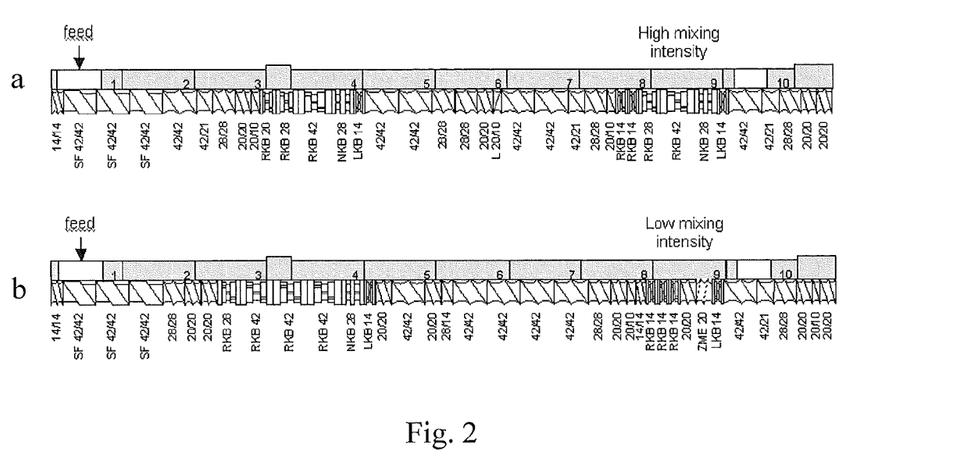
FIG. 2 illustrates two examples of screw configurations for a Coperion ZSK30 twin-screw co-rotating extruder.

FIG. 2 illustrates two non-limiting examples of screw configurations for a Coperion ZSK30 twin-screw co-rotating extruder that are useful for conducting melt blending. The extruder configurations comprise a plurality of individual mixing elements which are identified by alphanumeric codes. Mixing elements that begin with a number are forward conveying elements. SF stands for single flighted element, RKB stands for forward kneading element, NKB stands for neutral kneading element, LKB stands for reverse kneading element, and ZME stands for slotted single flighted reverse conveying element. The last two digits in the code is the length in millimeters of the mixing element. For conveying elements, which propel the composition forward or backward, the number before the slash ("/") is the pitch, i.e. the axial length in millimeters required for a flight to make a complete revolution. FIG. 2a depicts a full screw configuration which has a high intensity mixing element in the downstream portion of the configuration. FIG. 2b depicts a full screw configuration which has a low intensity mixing element in the downstream portion of the configuration.

In some embodiments, the composition of the fiber is formed by solution blending. In solution blending, the poly(phenylene ether), and optionally poly(alkenyl) aromatic and/or additives are dissolved in a solvent to effect mixing. The solvent is then removed by evaporation, for example by vacuum distillation, to provide a poly(phenylene ether) blend in powder form. A suitable pressure or pressure range can be chosen so that the evaporation temperature is minimized. Advantageously, solution blending provides poly(phenylene ether) compositions that have not been subject to the heat history that melt blended poly(phenylene ether) pellets are subject to. When the composition is formed by solution blending rather than melt blending, the content of hydroxyl groups associated with ethylene bridge groups and hydroxyl groups associated with rearranged backbone groups can be reduced.

A method of forming a fiber comprises spinning a composition comprising a poly(phenylene ether), wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(phenylene ether). All of the above-described variations in the composition apply as well to the method of forming the fiber. For example, the method of forming a fiber can comprise spinning a composition comprising about 50 to 100 weight percent of the poly(phenylene ether), and 0 to about 50 weight percent of a poly(alkenyl aromatic); wherein all weight percents are based on the total weight of the poly(phenylene ether) and the poly(alkenyl aromatic). In some embodiments, the poly(phenylene ether) comprises poly(2,6 dimethyl-1,4-phenylene ether) and the poly(alkyl aromatic) comprises atactic homopolystyrene.

Any of several spinning methods can be used to form the fiber. The spinning method can be, for example, melt spinning, wet spinning, dry spinning, electrospinning, extrusion spinning, direct spinning, or gel spinning. Wet spinning, dry spinning, and electrospinning are all variations of solution spinning. In these methods, the polymer is dissolved in a solvent, and the polymer solution is pumped through a spinneret or die having one or a plurality of holes. In wet spinning, the spinneret is immersed in an antisolvent bath that causes the fiber to precipitate and solidify when it emerges from the spinneret. In dry spinning, fiber solidification is achieved by evaporation of the solvent, usually by means of a stream of air or inert gas. In electrospinning, the fiber drawing force is supplied by a large electric potential difference between the polymer solution and a target. In some embodiments, the spinning comprises melt spinning.

In a specific embodiment, a method of forming a fiber comprises melt blending about 70 to 100 weight percent of poly(2,6-dimethyl-1,4-phenylene ether); and 0 to about 30 weight percent atactic homopolystyrene to form a composition; wherein all weight percents are based on the total weight of the poly(2,6-dimethyl-1,4-phenylene ether) and the atactic homopolystyrene; and melt spinning the composition to form the fiber, wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

The present inventors have determined that when the fiber comprises a poly(phenylene ether) comprising less than 240 parts per million by weight of hydroxyl groups associated with ethylene bridge groups and less than 800 parts per million by weight of hydroxyl groups associated with rearranged backbone groups, both amounts based on the weight of the poly(phenylene ether), the minimum achievable fiber denier is reduced. Thus, the composition is ideally suited to provide fiber of low denier. The term "denier" refers the weight of the fiber in grams per 9,000 meters of fiber. In some embodiments, the fiber has as denier of less than or equal to 20, specifically less than or equal to 16, more specifically less than or equal to 12, still more specifically less than or equal to 10, yet more specifically less than or equal to 9, and even more specifically less than or equal to 8.

The invention includes at least the following embodiments.

Embodiment 1: A fiber comprising a composition comprising a poly(phenylene ether), wherein the fiber comprises less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether).

Embodiment 2: The fiber of embodiment 1, having a denier of less than or equal to 10.

Embodiment 3: The fiber of embodiment 1 or 2, wherein the composition comprises about 50 to 100 weight percent of the poly(phenylene ether), and 0 to about 50 weight percent of a poly(alkenyl aromatic); and wherein all weight percents are based on the total weight of the poly(phenylene ether) and the poly(alkenyl aromatic).

Embodiment 4: The fiber of any of embodiments 1-3, wherein the composition consists of the poly(phenylene ether), the poly(alkenyl aromatic), and optionally about 0.1 to about 10 weight percent, based on the total weight of the composition, of one or more additives selected from the group consisting of stabilizers, antioxidants, mold release agents, processing aids, flame retardants, drip retardants, nucleating agents, UV blockers, dyes, pigments, anti-static agents, blowing agents, mineral oil, metal deactivators, anti-blocking agents, and conductive agents.

Embodiment 5. The fiber of any of embodiments 1-4, wherein the composition comprises less than or equal to 20 weight percent polyamide.

Embodiment 6. The fiber of any of embodiments 1-5, wherein the composition is homogeneous.

Embodiment 7. The fiber of any of embodiments 1-6, wherein the fiber is a solid fiber.

Embodiment 8. The fiber of any of embodiments 1-7, wherein the composition further comprises an impact modifier, wherein the composition comprises a continuous phase comprising the poly(phenylene ether) and a disperse phase comprising the impact modifier, and wherein the disperse phase average particle size is less than or equal to 2 micrometers.

Embodiment 9. The fiber of any of embodiments 3-8, wherein the poly(phenylene ether) comprises poly(2,6-dimethyl-1,4-phenylene ether) and the poly(alkenyl aromatic) comprises atactic homopolystyrene.

Embodiment 10. The fiber of embodiment 1, wherein the fiber comprise a composition comprising about 70 to 100 weight percent of poly(2,6-dimethyl-1,4-phenylene ether); and 0 to about 30 weight percent atactic homopolystyrene; wherein all weight percents are based on the total weight of the poly(2,6-dimethyl-1,4-phenylene ether) and the atactic homopolystyrene, and wherein the poly(2,6-dimethylphenyl-1,4-phenylene ether) comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

Embodiment 10a. A fiber comprising a composition comprising about 70 to 100 weight percent of poly(2,6-dimethyl-1,4-phenylene ether); and 0 to about 30 weight percent atactic homopolystyrene; wherein all weight percents are based on the total weight of the poly(2,6-dimethyl-1,4-phenylene ether) and the atactic homopolystyrene, and wherein the poly(2,6-dimethylphenyl-1,4-phenylene ether) comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

Embodiment 11. The fiber of embodiment 10a, wherein the fiber comprise a composition comprising about 90 to 100 weight percent of poly(2,6-dimethyl-1,4-phenylene ether); and 0 to about 10 weight percent atactic homopolystyrene; wherein all weight percents are based on the total weight of the poly(2,6-dimethyl-1,4-phenylene ether) and the atactic homopolystyrene.

Embodiment 12. A method of forming a composition comprising mixing about 50 to about 99 weight percent of a poly(phenylene ether), and about 1 to about 50 weight percent of a poly(alkenyl aromatic); wherein all weight percents are based on the total weight of the poly(phenylene ether) and the poly(alkenyl aromatic); and wherein the composition comprises less than or equal to 240 parts per million by weight of hydroxyl groups associated with ethylene bridge groups and less than or equal to 800 parts per million by weight of hydroxyl groups associated with rearranged backbone groups, both amounts based on the weight of the poly(phenylene ether).

Embodiment 13. The method of embodiment 12, wherein the composition further comprises an impact modifier, wherein the composition comprises a continuous phase comprising the poly(phenylene ether) and a disperse phase comprising the impact modifier, and wherein the disperse phase average particle size is less than or equal to 2 micrometers.

Embodiment 14. The method of embodiment 12 or 13, wherein the poly(phenylene ether) comprises poly(2,6-dimethyl-1,4-phenylene ether) and the poly(alkyl aromatic) comprises atactic homopolystyrene.

Embodiment 15. The method of any of embodiments 12-14, wherein the method is melt blending.

Embodiment 16. A method of forming a fiber, comprising spinning a composition comprising a poly(phenylene ether), wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(phenylene ether).

Embodiment 17. The method of embodiment 16, wherein the composition comprises about 50 to 100 weight percent of the poly(phenylene ether), and 0 to about 50 weight percent of a poly(alkenyl aromatic); and wherein all weight percents are based on the total weight of the poly(phenylene ether) and the poly(alkenyl aromatic).

Embodiment 18. The method of embodiment 16 or 17, wherein the composition further comprises an impact modifier, wherein the composition comprises a continuous phase comprising the poly(phenylene ether) and a disperse phase comprises the impact modifier, and wherein the disperse phase average particle size is less than or equal to 2 micrometers.

Embodiment 19. The method of any of embodiments 16-18, wherein the poly(phenylene ether) comprises poly(2,6-dimethyl-1,4-phenylene ether) and the poly(alkyl aromatic) comprises atactic homopolystyrene.

Embodiment 20. The method of any of embodiments 16-19, wherein the spinning comprises melt spinning.

Embodiment 21. The method of Embodiment 16, comprising melt spinning a composition comprising about 70 to 100 weight percent of the poly(2,6-dimethyl-1,4-phenylene ether); and 0 to 30 weight percent of an atactic homopolystyrene; wherein all weight percents are based on the total weight of the poly(2,6-dimethyl-1,4-phenylene ether) and the atactic homopolystyrene.

Embodiment 21a. A method of forming a fiber, comprising melt spinning a composition comprising about 70 to 100 weight percent of poly(2,6-dimethyl-1,4-phenylene ether); and 0 to 30 weight percent atactic homopolystyrene; wherein all weight percents are based on the total weight of the poly (2,6-dimethyl-1,4-phenylene ether) and the atactic homopolystyrene; and wherein the fiber comprises less than 240 parts per million by weight of hydroxyl groups associated with ethylene bridge groups and less than 800 parts per million by weight of hydroxyl groups associated with rearranged backbone groups, both amounts based on the weight of the poly(2,6-dimethyl-1,4-phenylene ether).

The invention is further illustrated by the following non-limiting examples.

EXAMPLES

Figure 1:
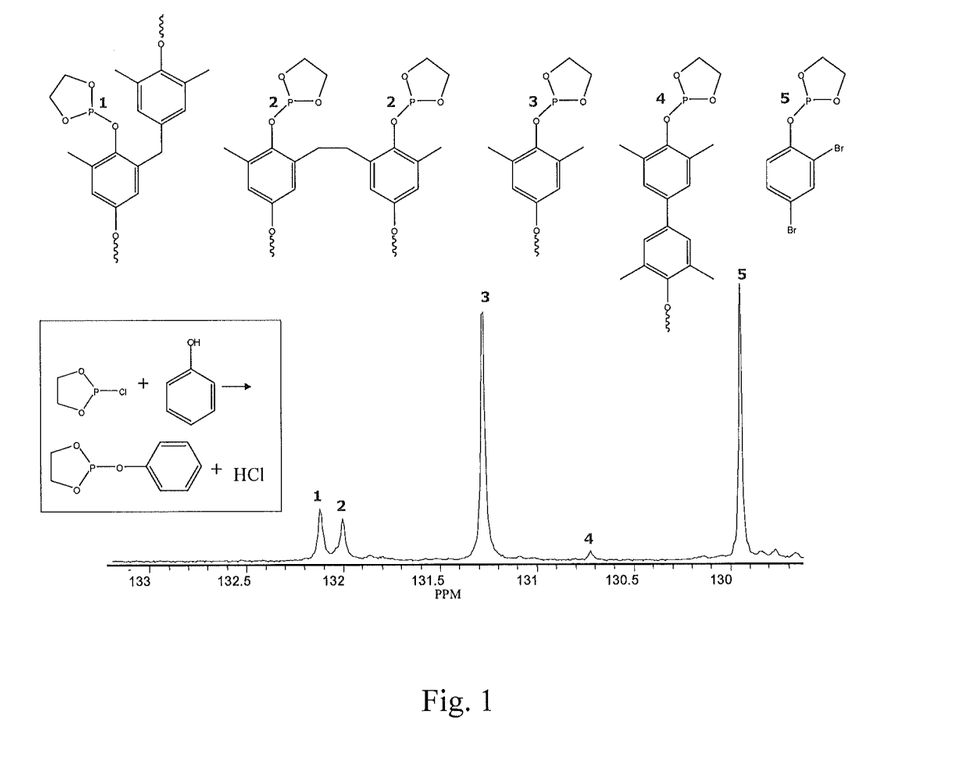
FIG. 1 depicts the reaction of phenol with 2-chloro-1,3,2-dioxaphospholane, the chemical structures of various derivatized phenolic groups, and a typical $^{31}P$ nuclear magnetic resonance spectrum of derivatized poly(phenylene ether) indicating the chemical shifts of the derivatized phenolic groups.

The method for the identification and quantification of phenolic functionality in poly(phenylene ether) comprises derivatization of hydroxyl groups of poly(phenylene ether) with 2-chloro-1,3,2-dioxaphospholane, and identification and quantification of the phenolic groups by $^{31}P$ nuclear magnetic resonance (NMR) spectroscopy using an internal standard. The derivatization reaction produces a variety of structurally similar 2-aryloxy-1,3,2-dioxaphospholanes differing only in aromatic ring substitution. Because of the sensitivity of the chemical shift of the $^{31}P$ nucleus to its electronic environment, the various hydroxyl groups on poly(phenylene ether) can be identified from the $^{31}P$-chemical shifts of the corresponding phosphate derivatives. FIG. 1 depicts the model reaction of phenol with 2-chloro-1,3,2-dioxaphospholane, the chemical structures of derivatized phenolic groups 1-5, and a typical $^{31}P$ NMR spectrum of derivatized poly(phenylene ether) indicating the $^{31}P$ chemical shifts of derivatized phenolic groups 1-5. Derivatized phenolic group 1 is the backbone rearranged group, and derivatized phenolic group 2 is the ethylene bridge group. In addition to hydroxyl groups on poly(phenylene ether), this method can also quantify alcohol and acid groups. Quantification was achieved through the use of 2,4-dibromophenol as an internal standard.

All spectra were acquired on a Varian Mercury Plus NMR operating at 162 megahertz for the $^{31}$P nucleus. The instrument was equipped with a 10 millimeter broadband probe. The decoupler was gated off during the pulse delay to eliminate nuclear Overhauser effect and to ensure complete relaxation of phosphorus nuclei between scans. Acquisition parameters included a pulse delay of 3 seconds and a 45° flip angle. A 16.2 kilohertz spectral width and 12,600 data points resulted in a 800 millisecond acquisition time. Typically, 1000 scans were required for adequate signal-to-noise. Broadband proton decoupling was carried out using the Waltz-16 pulse sequence. The internal standard signal of the reaction product of the internal standard, 2,4-dibromophenol, with 2-chloro-1,3,2-dioxaphospholane was used as a chemical shift reference (d=129.95 parts per million). Spectra were processed using 1 hertz exponential apodization and were baseline corrected using a polynomial fit routine. All data processing was done using NetNMR software.

A sample was prepared for analysis by first making a solution of 300 grams of deuterated chloroform, 3 milliliters of pyridine, 2.00 grams of chromium(III) acetylacetonate, and 0.1600 gram of 2,4-dibromophenol. This was enough solution to prepare 50 samples. To 4 millimeters of this solution was added 0.3000 gram of sample, and the mixture was agitated on a high-speed shaker for approximately 15 minutes. After the sample had completely dissolved, it was poured into a 10 millimeter nuclear magnetic resonance tube. Five drops of 2-chloro-1,3,2-dioxaphospholane was added followed by vigorous shaking for 10 seconds to derivatize the phenolic groups.

When melt spinning thermoplastic resins, it is desirable to be able to draw down the extrudate from the spinneret into very thin fibers without fiber breakage. A desirable fiber thickness is 8 denier, where denier is defined as the weight in grams of 9000 meters of fiber. For a poly(phenylene ether)/polystyrene blend with a specific gravity of 1.1, 8 denier corresponds to a fiber diameter of about 32 micrometers. It has been observed that different lots of poly(phenylene ether)/polystyrene blends with identical nominal composition can behave differently in melt spinning. To study the effect of poly(phenylene ether) polymer chain structure on the ease of melt spinning, four pelletized samples of a blend consisting of 70 weight percent poly(2,6-dimethyl-1,4-phenylene ether) and 30 weight percent atactic homopolystyrene were extruded on a Coperion ZSK30 30-millimeter twin-screw co-rotating extruder operating at about 480 revolutions per minute. The poly(2,6-dimethyl-1,4-phenylene ether) had an intrinsic viscosity of 0.46 deciliter per gram, measured at 25° C. in chloroform. The atactic homopolystyrene had a melt flow index of 4.8 grams per 10 minutes at 200° C. and a 5 kilogram load according to ASTM D1238, and a mineral oil content of less than 2 weight percent, and was obtained as EA3130 from Americas Styrenics.

Examples 1 and 2 were melt blended using the low mixing intensity screw configuration of FIG. 2b at two different residence times, and pelletized. The extruder barrel temperature was maintained at 290° C. for all the examples. Example 1 was melt blended at a feed rate of 70 pounds per hour to obtain a low residence time, and Example 2 was melt blended at a feed rate of 10 pounds per hour to obtain a high residence time. Example 3 and Comparative Example 1 were melt blended using the high mixing intensity screw configuration of FIG. 2a, at two different residence times, and pelletized. Example 3 was melt blended at a feed rate of 20 pounds per hour to obtain a medium residence time, and Comparative Example 1 was melt blended at a feed rate of 10 pounds per hour to obtain a high residence time. The variations in screw configuration and residence time resulted in different amounts of ethylene bridge hydroxyl groups and backbone rearranged hydroxyl groups as measured by $^{31}$P NMR. The melt blending conditions and NMR results for the melt blended pellets are summarized in Table 1.

TABLE 1

| | Melt Blending Conditions | | Hydroxyl Content in PPE (ppm) | | | | Minimum Achievable Denier |
|---|---|---|---|---|---|---|---|
| | | | Ethylene Bridge | | Backbone Rearranged | | |
| Example | Mixing Intensity | Residence Time | Pellets | Fibers | Pellets | Fibers | |
| Ex. 1 | Low | Low | 161 | 164 | 258 | 319 | 8 |
| Ex. 2 | Low | High | 196 | 208 | 540 | 643 | 9 |
| Ex. 3 | High | Medium | 187 | 210 | 534 | 615 | 10 |
| C. Ex. 1 | High | High | 214 | 221 | 802 | 870 | No fibers |

The melt blended compositions were melt spun at 320° C. on a Hills Model GHP Pilot Fiber Spinning line equipped with a 144 hole spinneret with 0.6 millimeter diameter and 2.4 millimeter long holes. This line was equipped with a 1.25 inch diameter resin melting screw and a 10 cubic centimeters per revolution melt pump. The pump was operated between 8 and 16 revolutions per minute and the fibers were pulled at speeds between 500 and 1600 meters per minute in order to try to obtain the smallest possible diameter fiber. The minimum achievable denier as defined herein is the smallest diameter fiber that could be obtained without more than one fiber break every five minutes. In Comparative Example 1, the fiber extrudate could not be placed on the godets without breaking. The data show that smaller diameter fibers could be spun from the compositions having lower levels of ethylene bridge groups and backbone rearranged groups. The data also show that the levels of ethylene bridge groups and backbone rearranged groups generally do not increase very much during the fiber spinning process.

Table 2 shows the results of spinning blends of poly(phenylene ether) and atactic homopolystyrene that contain varying amounts of poly(phenylene ether). As can be seen from Table 2, as the level of poly(phenylene ether) increased, the level of ethylene bridge groups and backbone rearranged groups increased, as did the minimum achievable fiber denier. Without being bound by theory, these results can be explained by the higher melt blending temperatures necessitated by the higher glass transition temperature of the blends as the weight percent of poly(phenylene ether) was increased. Examples 4 and 5, and Comparative Example 2, having poly(phenylene ether) contents of 50, 70, and 90 weight percent, respectively, were melt blended at 293, 311 and 333° C., respectively.

TABLE 2

| Example | PPE (wt %) | Hydroxyl Content In PPE Pellets (ppm) | | Minimum Achievable Denier |
|---|---|---|---|---|
| | | Ethylene Bridge | Backbone Rearranged | |
| Ex. 4 | 50 | 160 | 85 | 3 |
| Ex. 5 | 70 | 207 | 194 | 6 |
| C. Ex. 2 | 90 | 243 | 370 | No fibers |

As further evidence of the influence of poly(phenylene ether) structure on the ability to spin fibers, four different lots of NORYL PKN4752, a blend of 70 weight percent PPE in atactic homopolystyrene commercially available from SABIC Innovative Plastics, were spun into fibers in the 6 to 10 denier range at Fiber Science Inc. of Palm Bay, Fla. The results are summarized in Table 3. Significant variability among the lots was found. As defined herein, a lot ran well if there was less than or equal to one fiber break per 30 minutes of fiber spinning. A lot ran poorly if there were more than 10 fiber breaks per 30 minutes of fiber spinning. Retains of these lots were later analyzed for hydroxyl content and these results are also reported in Table 3.

TABLE 3

| Sample | PPE (wt %) | Hydroxyl Content In PPE Pelets (ppm) | | Observations |
|---|---|---|---|---|
| | | Ethylene Bridge | Backbone Rearranged | |
| Ex. 6 | 70 | 236 | 671 | Ran well. |
| C. Ex. 3 | 70 | 293 | 747 | Ran poorly. |
| C. Ex. 4 | 70 | 286 | 883 | Ran poorly. |
| Ex. 7 | 70 | 183 | 236 | Ran well. |

It is clear from these data that to consistently melt spin a poly(phenylene ether)-based fiber at less than 6 to 10 denier, the levels of ethylene bridge groups and backbone rearranged groups should be minimized.

The invention claimed is:

1. A fiber comprising a composition comprising a poly(phenylene ether),
wherein the fiber comprises hydroxyl groups associated with ethylene bridge groups and hydroxyl groups associated with rearranged backbone groups; and
wherein the fiber comprises greater than 0 and less than or equal to 240 parts per million by weight of hydroxyl groups associated with ethylene bridge groups and greater than 0 to less than or equal to 800 parts per million by weight of hydroxyl groups associated with rearranged backbone groups, both amounts based on the weight of the poly(phenylene ether).

2. The fiber of claim 1, having a denier of less than or equal to 10.

3. The fiber of claim 1, wherein the composition comprises about 50 to 100 weight percent of the poly(phenylene ether), and 0 to about 50 weight percent of a poly(alkenyl aromatic); and
wherein all weight percents are based on the total weight of the poly(phenylene ether) and the poly(alkenyl aromatic).

4. The fiber of claim 3, wherein the composition consists of the poly(phenylene ether), the poly(alkenyl aromatic), and optionally about 0.1 to about 10 weight percent, based on the total weight of the composition, of one or more additives selected from the group consisting of stabilizers, antioxidants, mold release agents, processing aids, flame retardants, drip retardants, nucleating agents, UV blockers, dyes, pigments, anti-static agents, blowing agents, mineral oil, metal deactivators, anti-blocking agents, and conductive agents.

5. The fiber of claim 1, wherein the composition comprises less than or equal to 20 weight percent polyamide.

6. The fiber of claim 1, wherein the composition is homogeneous.

7. The fiber of claim 1, wherein the fiber is a solid fiber.

8. The fiber of claim 1, wherein the composition further comprises an impact modifier, wherein the composition comprises a continuous phase comprising the poly(phenylene ether) and a disperse phase comprising the impact modifier, and wherein the disperse phase average particle size is less than or equal to 2 micrometers.

9. The fiber of claim 3, wherein the poly(phenylene ether) comprises poly(2,6-dimethyl-1,4-phenylene ether) and the poly(alkenyl aromatic) comprises atactic homopolystyrene.

10. A fiber comprising a composition comprising
about 70 to 100 weight percent of poly(2,6-dimethyl-1,4-phenylene ether); and
0 to about 30 weight percent atactic homopolystyrene;
wherein all weight percents are based on the total weight of the poly(2,6-dimethyl-1,4-phenylene ether) and the atactic homopolystyrene;
wherein the poly(2,6-dimethyl-4-phenylene ether) comprises hydroxyl groups associated with ethylene bridge groups and hydroxyl groups associated with rearranged backbone groups; and
wherein the poly(2,6-dimethylphenyl-1,4-phenylene ether) comprises greater than 0 and less than 240 parts per million by weight of hydroxyl groups associated with ethylene bridge groups and greater than 0 and less than 800 parts per million by weight of hydroxyl groups associated with rearranged backbone groups, both amounts based on the weight of the poly(2,6-dimethyl-1,4-phenylene ether).

11. The fiber of claim 10, wherein the composition comprises about 90 to 100 weight percent poly(2,6-dimethyl-1,4-phenylene ether) and 0 to about 10 weight percent atactic polystyrene; and
wherein all weight percents are based on the total weight of the poly(2,6-dimethyl-1,4-phenylene ether) and the atactic homopolystyrene.

12. A method of forming a composition comprising mixing about 50 to about 99 weight percent of a poly(phenylene ether), and about 1 to about 50 weight percent of a poly(alkenyl aromatic);
wherein all weight percents are based on the total weight of the poly(phenylene ether) and the poly(alkenyl aromatic);
wherein the composition comprises hydroxyl groups associated with ethylene bridge groups and hydroxyl groups associated with rearranged backbone groups; and
wherein the composition comprises greater than 0 and less than or equal to 240 parts per million by weight of hydroxyl groups associated with ethylene bridge groups and greater than 0 and less than or equal to 800 parts per million by weight of hydroxyl groups associated with rearranged backbone groups, both amounts based on the weight of the poly(phenylene ether).

13. The method of claim 12, wherein the composition further comprises an impact modifier, wherein the composition comprises a continuous phase comprising the poly(phenylene ether) and a disperse phase comprising the impact modifier, and wherein the disperse phase average particle size is less than or equal to 2 micrometers.

14. The method of claim 12, wherein the poly(phenylene ether) comprises poly(2,6-dimethyl-1,4-phenylene ether) and the poly(alkyl aromatic) comprises atactic homopolystyrene.

15. The method of claim 12, wherein the method is melt blending.

16. A method of forming a fiber, comprising spinning a composition comprising a poly(phenylene ether), wherein the fiber comprises hydroxyl groups associated with ethylene bridge groups and hydroxyl groups associated with rearranged backbone groups; and wherein the fiber comprises greater than 0 and less than 240 parts per million by weight of hydroxyl groups associated with ethylene bridge groups and greater than 0 and less than 800 parts per million by weight of hydroxyl groups associated with rearranged backbone groups, both amounts based on the weight of the poly(phenylene ether).

17. The method of claim 16, wherein the composition comprises about 50 to 100 weight percent of the poly(phenylene ether), and 0 to about 50 weight percent of a poly(alkenyl aromatic); and
   wherein all weight percents are based on the total weight of the poly(phenylene ether) and the poly(alkenyl aromatic).

18. The method of claim 16, wherein the composition further comprises an impact modifier, wherein the composition comprises a continuous phase comprising the poly(phenylene ether) and a disperse phase comprises the impact modifier, and wherein the disperse phase average particle size is less than or equal to 2 micrometers.

19. The method of claim 16, wherein the poly(phenylene ether) comprises poly(2,6-dimethyl-1,4-phenylene ether) and the poly(alkyl aromatic) comprises atactic homopolystyrene.

20. The method of claim 16, wherein the spinning comprises melt spinning.

21. A method of forming a fiber, comprising melt spinning a composition comprising
   about 70 to 100 weight percent of poly(2,6-dimethyl-1,4-phenylene ether); and
   0 to 30 weight percent atactic homopolystyrene;
   wherein all weight percents are based on the total weight of the poly(2,6-dimethyl-1,4-phenylene ether) and the atactic homopolystyrene;
   wherein the fiber comprises hydroxyl groups associated with ethylene bridge groups and hydroxyl groups associated with rearranged backbone groups; and
   wherein the fiber comprises greater than 0 and less than 240 parts per million by weight of hydroxyl groups associated with ethylene bridge groups and greater than 0 and less than 800 parts per million by weight of hydroxyl groups associated with rearranged backbone groups, both amounts based on the weight of the poly(2,6-dimethyl-1,4-phenylene ether).

22. The fiber of claim 1, wherein the composition comprises about 50 to 99 weight percent of the poly(phenylene ether), and 1 to about 50 weight percent of a poly(alkenyl aromatic); and
   wherein all weight percents are based on the total weight of the poly(phenylene ether) and the poly(alkenyl aromatic).

23. The fiber of claim 1, wherein the fiber comprises 164 to 210 parts per million by weight of hydroxyl groups associated with ethylene bridge groups and 319 to 615 parts per million by weight of hydroxyl groups associated with rearranged backbone groups, both amounts based on the weight of the poly(phenylene ether).

24. The fiber of claim 1, having a denier of 3 to 10.

* * * * *